United States Patent
Becker et al.

(10) Patent No.: US 7,533,937 B2
(45) Date of Patent: May 19, 2009

(54) FORWARDLY MOVABLE AUTOMOTIVE VEHICLE SEAT, MORE SPECIFICALLY FOR A TWO DOOR VEHICLE

(75) Inventors: Burckhard Becker, Solingen (DE); Wilfried Beneker, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 348 days.

(21) Appl. No.: 11/109,963

(22) Filed: Apr. 20, 2005

(65) Prior Publication Data
US 2006/0061175 A1    Mar. 23, 2006

(30) Foreign Application Priority Data
Jun. 22, 2004  (DE) ...................... 10 2004 030 169
Dec. 20, 2004  (DE) ...................... 10 2004 061 139

(51) Int. Cl.
*B60N 2/20*   (2006.01)
(52) U.S. Cl. .................. 297/378.14; 297/341
(58) Field of Classification Search ................ 297/341, 297/378.12, 378.14
See application file for complete search history.

(56) References Cited

U.S. PATENT DOCUMENTS 5,352,019 A    10/1994   Bauer et al.
6,857,702 B2 *  2/2005   Becker et al. ............... 297/341

FOREIGN PATENT DOCUMENTS

DE    101 51 762 A1    5/2003

* cited by examiner

*Primary Examiner*—Milton Nelson, Jr.
(74) *Attorney, Agent, or Firm*—Novak Druce & Quigg (57) ABSTRACT

The forwardly movable automotive vehicle seat has a seat back and a seat frame with a seat part. The automotive vehicle seat can be moved between a normally adopted utilization position and a forwardly moved position. A locking device is associated with the seat frame; the seat back has a seat back hinge and a stop device. The stop device retains the seat back in the forwardly folded position as long as the seat frame is located in a front portion of a displacement path. The stop device allows the seat back to be released so that it may be folded upward into the normal utilization position when the seat frame is located in a rear portion of the displacement path. The stop device has a first limit stop and a second limit stop, one of said limit stops being disposed on the seat frame and the other one on the seat back.

9 Claims, 7 Drawing Sheets

FORWARDLY MOVABLE AUTOMOTIVE VEHICLE SEAT, MORE SPECIFICALLY FOR A TWO DOOR VEHICLE

The vehicle relates to a forwardly movable vehicle seat particularly suited for use as a front seat of automotive vehicles equipped with only one side door on either side of the vehicle. It is known that forward movement of the seat may facilitate access to a row of seats located behind. Forward and backward movement of the seat are both performed manually. The forces needed for displacing the seat are applied by a user onto the vehicle seat, with the user more specifically taking hold of the upper region of the seat back and thus pushing the entire automotive vehicle seat into the forwardly moved position or returning the entire automotive vehicle seat from a forwardly moved position to the utilization position. The forces a user has to exert for this purpose should be as small as possible for forward and return movement, to be readily performable.

A variety of such forwardly movable vehicle seats are known in the art; reference is made by way of example to DE 101 51 762 A1 and to U.S. Pat. No. 5,352,019.

Such forwardly movable automotive vehicle seats are preferably also equipped with a memory unit. This memory unit stores the utilization position and permits the seat to return back into said utilization position when the vehicle seat is returned from a forwardly moved position.

The seat frame is connected to an underbody of an automotive vehicle. Suited means are provided therefore. The invention relates both to seat frames equipped with a lengthwise adjusting device comprising two pairs of rails with the pairs of rails being lockable through a locking unit and to automotive vehicle seats that are moved forward by articulated arms that are hinge-linked between the seat part and an underbody.

The already mentioned DE 101 51 762 A1 describes a forwardly movable vehicle seat in which a stop device is associated with the seat back joint. In a first stop position, said stop device retains the seat back in the normal utilization position. In a second stop position, the stop device retains the seat back in a forwardly pivoted position. A special transmission means ensures that the stop device is capable of adopting the second stop position in a front portion of the displacement path only, not in a rear portion thereof. The disclosure made in DE 101 51 762 A1 is incorporated herein by reference.

This forwardly movable seat causes the following problem: to return the vehicle seat from a forwardly moved position, a certain actuation force, which is usually applied to the seat back, is needed. Said actuation force, which is exerted by a user, also acts onto the stop device and causes the stop device to be pressed into the stop position further than when said actuation force is not being applied. The two limit stops ensuring the stop position are pressed against each other, with the lever arm formed by the seat back effecting transmission of the actuation force and, as a result thereof, an increased contact force between the two limit stops arises. As a result, separating these two limit stops during the return movement is much more difficult than when no actuation force is applied. Actuation and disengagement of the stop device during return movement can therefore not be achieved without additional energy supply.

That is where the invention comes in. It is directed to develop the forwardly movable automotive vehicle seat as disclosed in DE 101 51 762 in such a manner that the stop device may also be disengaged when an actuation force is applied to the seat back and during return movement of the automotive vehicle seat.

This object is solved by configuring at least one limit stop as a rotary part and/or as a free arm of a retaining lever and by having the retaining lever forming a folding lever.

As contrasted with the forwardly movable automotive vehicle seat as disclosed in DE 101 51 762, at least one limit stop of the stop device is now configured such that this limit stop, or the other one, can be pulled free from a stop position by exerting the smallest possible force. As a result, the forces available while the automotive vehicle seat is manually caused to return will suffice to release the stop device.

Usually, the stop device is connected by means of a transmission means, in most cases configured as a Bowden cable, to that region of the seat frame in which relative movement occurs during displacement, meaning for example between the rails of a lengthwise adjusting device or between articulated arms and parts connected to the underbody of the vehicle. This transmission means only permits to provide and transmit a certain force with said force indirectly originating from the actuation force. Thanks to the friction-reducing configuration of at least one of the two limit stops, the force needed to disengage the stop device is now much smaller than in the prior art.

At least one of the two limit stops of the stop device comprises a reel and/or at least one limit stop is configured as a free arm of a folding lever. The reel or the free arm of the folding lever is resting against the other limit stop when the stop device is in the stop position. In both cases, the stop device can be released using a relatively small stop force. In prior art, this is not possible since there the two stop parts can only be separated from each other in that the one stop part is caused to frictionally move along the other, meaning that it is caused to frictionally slide over the other one. The thereby generated friction forces are so high that they cannot be overcome with the forces actually available during return movement.

The invention permits to prevent sliding friction as it is known to occur in prior art. In the invention, rolling friction and/or deflection of a folding lever occurs. In the case of a folding lever, the two regions of the limit stops that actually contact each other while in the stop position are not caused to move relative to each other.

In a particularly preferred embodiment of the invention, the rear portion of the displacement path is quite short and ranges for example from 5 to 10 mm. This permits to ensure that the seat back may only be pulled upward into the utilization position after completion of the return movement of the seat frame. A certain path is needed for the rear portion since, but for this provision, it is not ensured that the seat back will be released in any case by the stop device and will be allowed to return to its utilization position prior to the completion of the return movement of the seat frame.

Other features and advantages will become more apparent upon reviewing the appended claims and the following non restrictive description of embodiments of the invention, given by way of example only with reference to the drawing. In said drawing:

The forwardly movable vehicle seat has a seat back 20 and a seat support 22. Said seat support has a left and a right side part 24. The seat back 20 is connected to the seat support 22 by a seat back hinge 32. To the seat back hinge 32 there belongs a lower fitting 34 that is connected to the seat support 22 so as to be pivotal about a pivot axis 36 of the seat back. Through well-known means that have not been illustrated herein, e.g., through a sector gear provided on the fitting 34 and a corresponding stop piece provided on the seat support 22, the angular position may be varied and fixed. There is disposed an upper fitting 38, which is also pivotal about the pivot axis 36 of the seat back, said upper fitting being durably connected to the seat back 20 and preferably being an integral part of a side frame portion of the seat back 20. A stop device 40, which consists of a plurality of individual parts that will be discussed herein after, is formed between the two fittings 34, 38. In the normal utilization position of the vehicle seat the stop device 40 permits to join the two fittings 34, 38 together as a unit. As the stop device 40 is released, the seat back 20 can be pivoted forward from its utilization position, with the two fittings 34, 38 being pivoted with respect to each other. Moreover, the seat back 20 can be retained in a forwardly pivoted position by means of the stop device 40 (see e.g., FIG. 1).

A disengagement member 42 is provided on the seat back 20 and is located at a side part of the seat back 20 in the upper region of said seat back 20. Said disengagement member is connected through a traction means 44 to a disengagement lever 46 having two arms that are substantially arranged in an L shape. The disengagement lever 46 is pivotally hinged to the upper fitting 38. Within its range of motion there is located a retaining lever 48 that is also pivotally hinged to the upper fitting 38. Said retaining lever 48 has a first limit stop 50 in the form of an arm that projects from the hinge axis in FIG. 1 essentially in the positive x-direction and somewhat in the negative z-direction and ends with a hook. Said first limit stop 50 cooperates with a second limit stop 52 that is a reel which is realized herein by a freely rotatable bolt. The bolt is disposed about an axis at the lower fitting 34. In the stop condition that has not been illustrated in FIG. 1, the hook engages behind said bolt. The hook engages in front of and somewhat beneath the freely rotatable bolt, thus securing the seat back 20 in the pivoted position as it is also shown in FIG. 1, meaning in a position in which it is pivoted forwardly from the utilization position at an angle of between about 40° and 50° or from the z-axis at an angle of between about 20° and 40°.

A first transmission means 54 is configured as a Bowden cable. At the top, the core of said cable is disposed at the upper fitting 38 while its jacket is supported by the lower fitting 34. At the bottom, it is connected to a locking unit 56 of a lengthwise adjusting device having a top rail 58 and a bottom rail 60. Said adjusting device is designed to be connected to an underbody 62 of an automotive vehicle that has not been illustrated in further detail herein.

Figure 1:
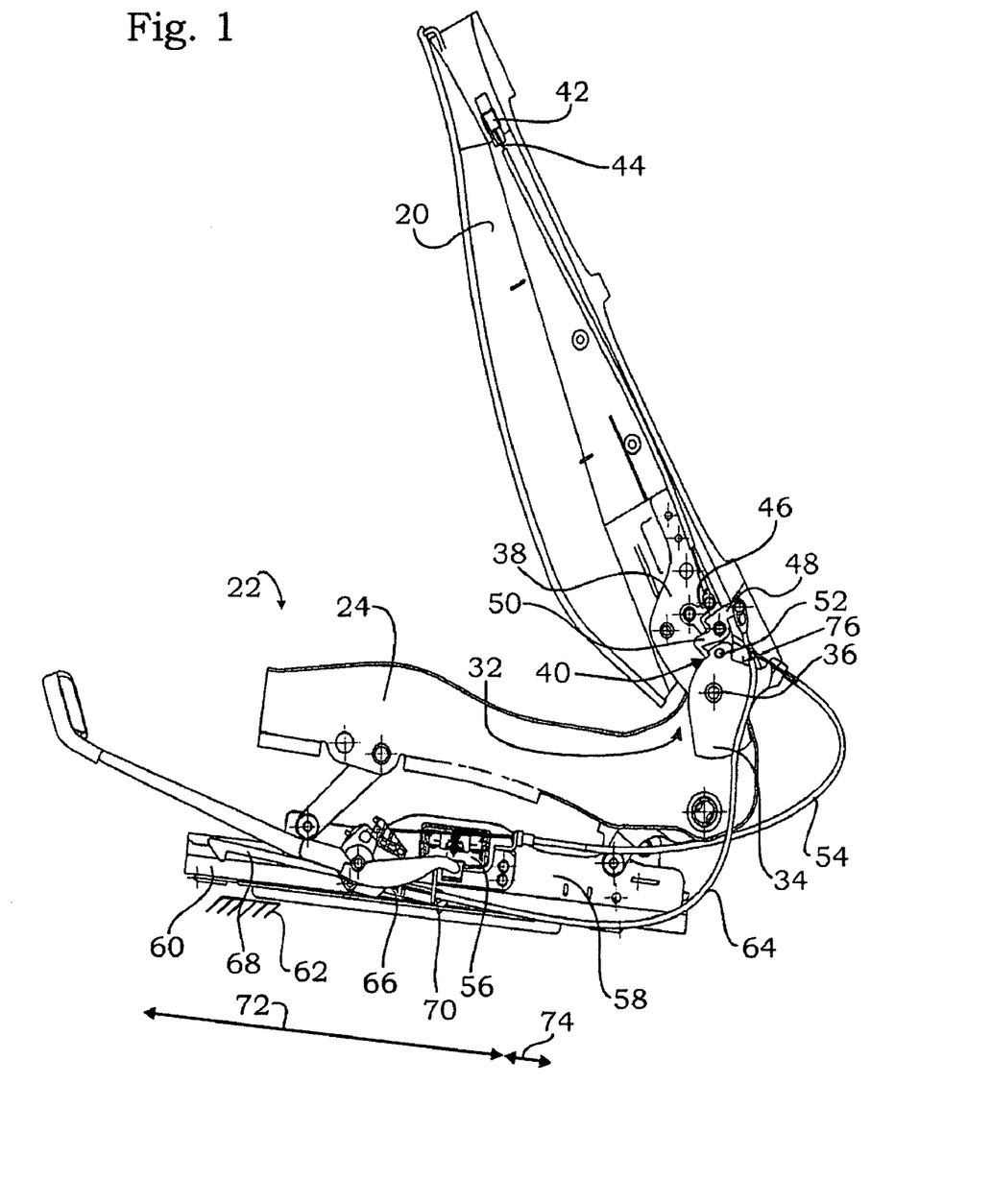
FIG. 1 shows a side view of a vehicle seat, substantially in the form of a sectional view taken in a plane lying in the xz-plane.

Further, a second transmission means 64 is provided. It is also configured to be a Bowden cable the core of which is applied to the retaining lever 48 where a long hole is provided while its jacket is supported by the lower fitting 34. At the bottom, the core is fastened to a slider piece 66 capable of freely sliding along a memory bar 68 of a memory unit. The jacket is supported by an abutment 70 that is connected to the top rail 58. Slider piece 66 and abutment 70 form part of a control device. Said control device and the second transmission means 64 form a disengagement system. The movement of the retaining lever 48 of the stop device 40 is controlled through the second transmission means 64. This approach proceeds as follows:

In the position of FIG. 1, the first transmission means 54 has already been actuated, the locking unit 56 being thus released so that the seat can be moved forward. As soon as a corresponding force is applied to the seat, such as to the seat back 20, the seat is caused to move forward so that the top rail 58 moves with respect to the stationary bottom rail 60. The abutment 70 thereby gets in proximity to the slider piece 66. At the top end region of the second Bowden cable 64, the core is pulled out of the associated jacket to the same extent. This permits the retaining lever 48 to pivot counter-clockwise into the stop position, meaning into a position located in front of the rotatable bolt 52, by the action of a biasing spring (see spring 86 in FIG. 5). This is only possible when the movement has reached a front portion 72 of the displacement path though. In a rear portion 74, the retaining lever is retained in the position also shown in FIG. 1 so that the stop position cannot be adopted.

When the automotive vehicle seat is later moved back, the slider piece 66 glides at first on the memory bar 68 until it reaches a catch provided on the memory bar 68. By moving the seat further backward, the core is again pulled out of the jacket in the bottom end region of the second Bowden cable 64. At the top, the core is retracted into the jacket and the retaining lever 48 pulled out of its stop position as a result thereof so that the seat back 20 can now be pivoted upward into the normal utilization position.

In the lower fitting 34 there is provided a bight portion 76 that conforms to the shape of the retaining lever 48 and more specifically to its first limit stop 50. The retaining lever 48 engages into said bight portion 76 when, starting from the position shown in FIG. 1, the seat back 20 is pivoted backward into the normal utilization position. Together with the bight portion 76, the first limit stop 50 of the retaining lever 48 forms a retaining device that fixes the seat back 20 in the normal utilization position. When the seat is to be moved forward, said retaining device is released as follows: upon actuation of the disengagement member 42, a lower nose of the disengagement lever 46 pivots against a disengagement side of the retaining lever 48, thus causing the retaining lever 48 to pivot away from the position in which it was resting against a front side (when viewed in the x-direction) of the bight portion 76. The seat back 20 is now allowed to pivot forward. FIG. 1 shows the condition in which the seat back 20 has already been pivoted forward, while the seat frame is still in the normal utilization position.

Figure 2:
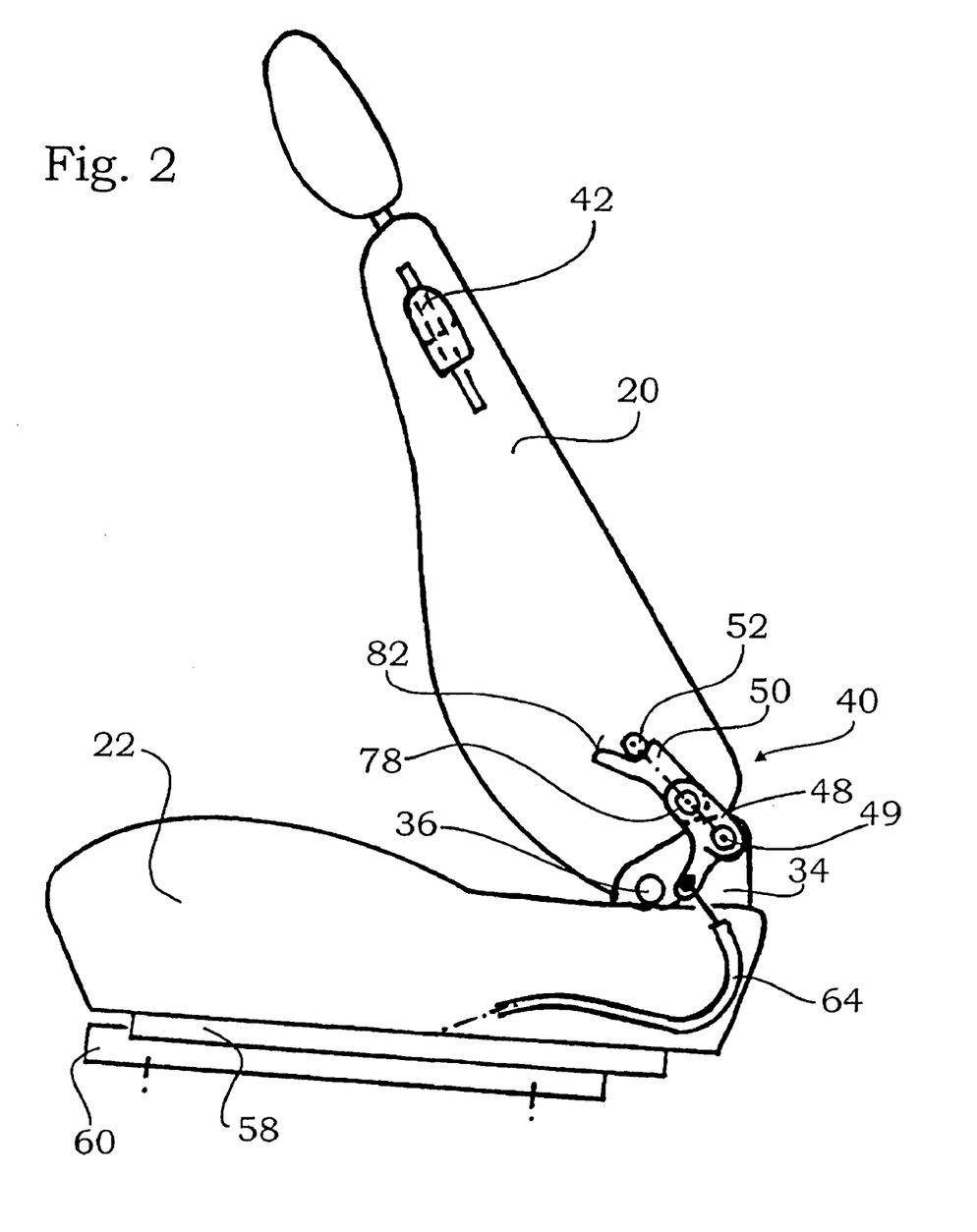
FIG. 2 shows a view similar to FIG. 1, but for another embodiment with a folding lever being now provided.
Figure 3:
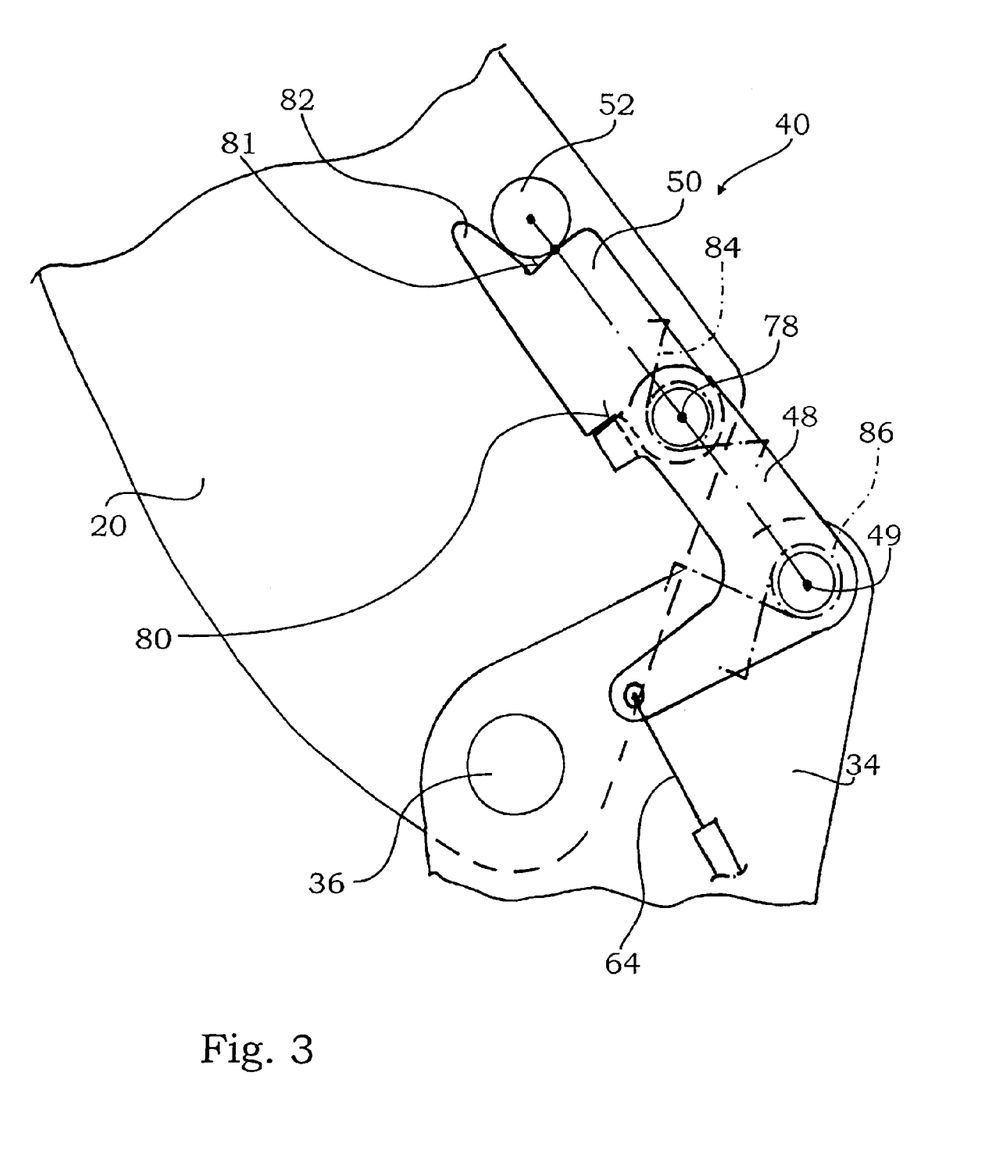
FIG. 3 shows an enlarged detail view of a detail of FIG. 2.
Figure 4:
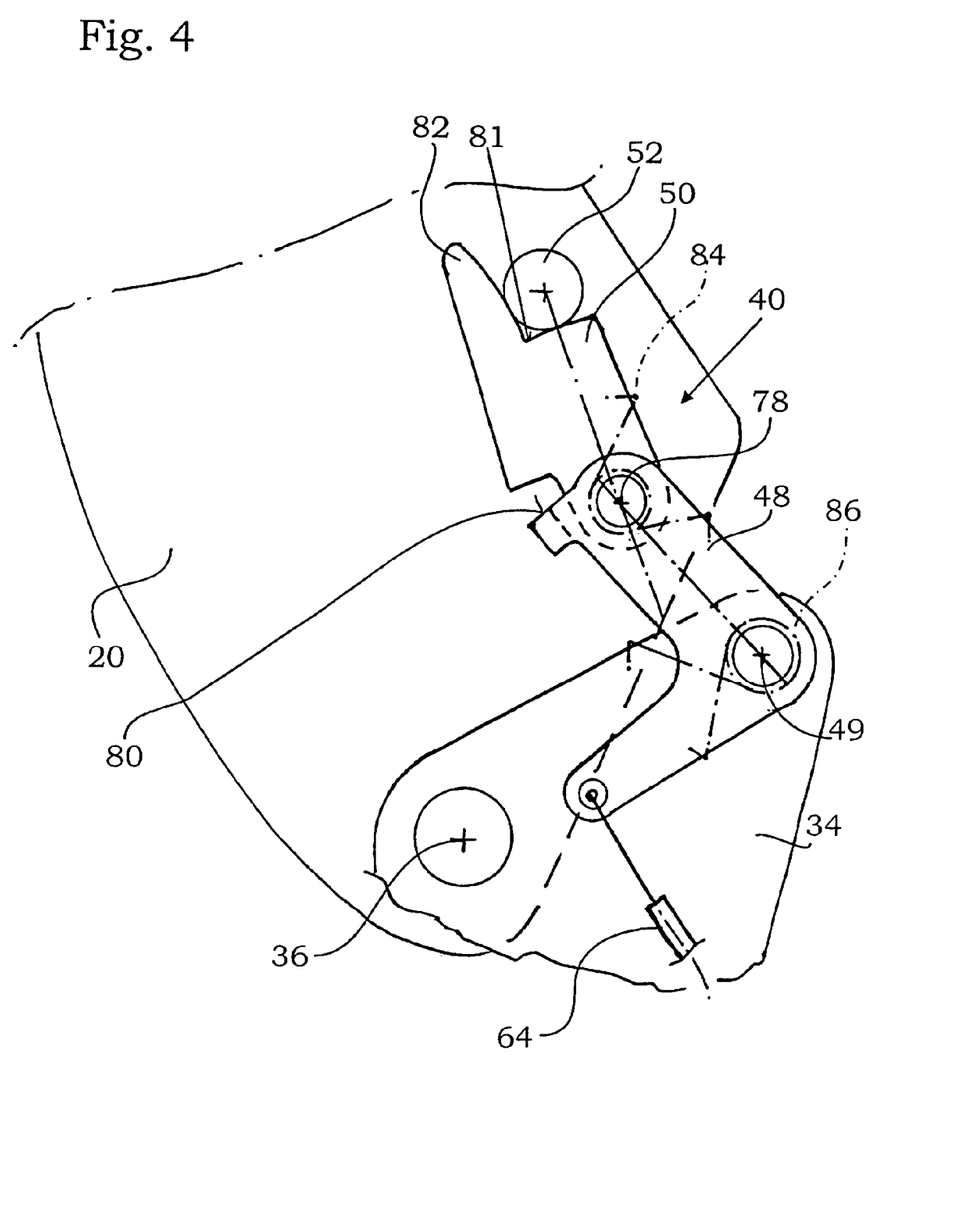
FIG. 4 shows a view according to FIG. 3 in another condition, with the stop device being pushed free.

The FIGS. 2-4 show a second exemplary embodiment. This embodiment differs from the first exemplary embodiment of FIG. 1 in that here the friction reduction in accordance with the invention in the region of the stop device 40 is not achieved by a rotary part, in particularly not by a reel, but by a folding lever. Now, the retaining lever 48 is hinged to the lower fitting 34. The core of the second transmission means 64 is still connected to a transverse arm of the retaining lever 48, the jacket is supported by the bottom fitting 34 or by a part that is connected fixedly thereto. At the bottom, the second transmission means 64 is connected to the rails 58, 60 or to a memory unit in a manner that has not been illustrated in further detail herein so that it is again made certain that in a front portion 72 the retaining lever 48 is in the condition as shown in the FIGS. 2 and 3. In this exemplary embodiment, the retaining lever 48 is configured as a folding lever and is provided for this purpose with the first limit stop 50. The second limit stop 52 is formed by a pin or a bolt that is made fast with the upper fitting 36. In an alternative implementation, said pin may also be configured as a rotatable reel like in the exemplary embodiment of FIG. 1. As long as the stop device 40 is in the stop position shown in the FIGS. 2 and 3, the two levers of this folding lever arrangement are extended, meaning the hinge points are substantially located on a straight line. Differences should be within the range of self-locking. When the second transmission means 64 is being pulled, the folding lever starts to fold. The corresponding state is shown in FIG. 4. Once a folded position lying beyond the range of self-locking is achieved, the folding movement continues automatically without traction by the second transmission means 64 when the force exerted onto the seat back is maintained.

As best shown in the FIGS. 3 and 4, a pivotal hinge 78 is located approximately in the center between a hinge point 49 of the disengagement lever 46 and the second limit stop 52. A catch 80, which rests against a corresponding step of the second limit stop 52 is provided in order to make certain that the folding lever arrangement cannot be moved beyond the 180 degree position. Accordingly, it is only allowed to fold so that in the FIGS. 2-4 the pivot hinge 78 is pulled obliquely forward and downward, meaning in the x- and z-direction.

At the free end of the retaining lever 48, that is at the second limit stop 52, there are formed an inclined clamping surface 81 and a projection 82. The inclined clamping surface 81 is oriented such that the retaining lever 48 cannot come free by itself but rather rests against the inclined clamping surface 81 and against the projection 82 oriented transversely thereto. The projection 82 makes certain that, within the entire angular range the seat back 20 is allowed to adopt with respect to the underframe, the retaining lever 48 remains (in the x-direction) before the second limit stop 52, meaning it will not be allowed to get behind it.

There is provided a spring 84 that is implemented here as a leg spring which is disposed in the region of the pivotal hinge 78 and biases the two levers forming the folding lever into the 180 degree position. A further spring 86 is provided, said spring acting onto the retaining lever 48, elastically biasing the same clockwise in the exemplary embodiment shown.

Figure 5:
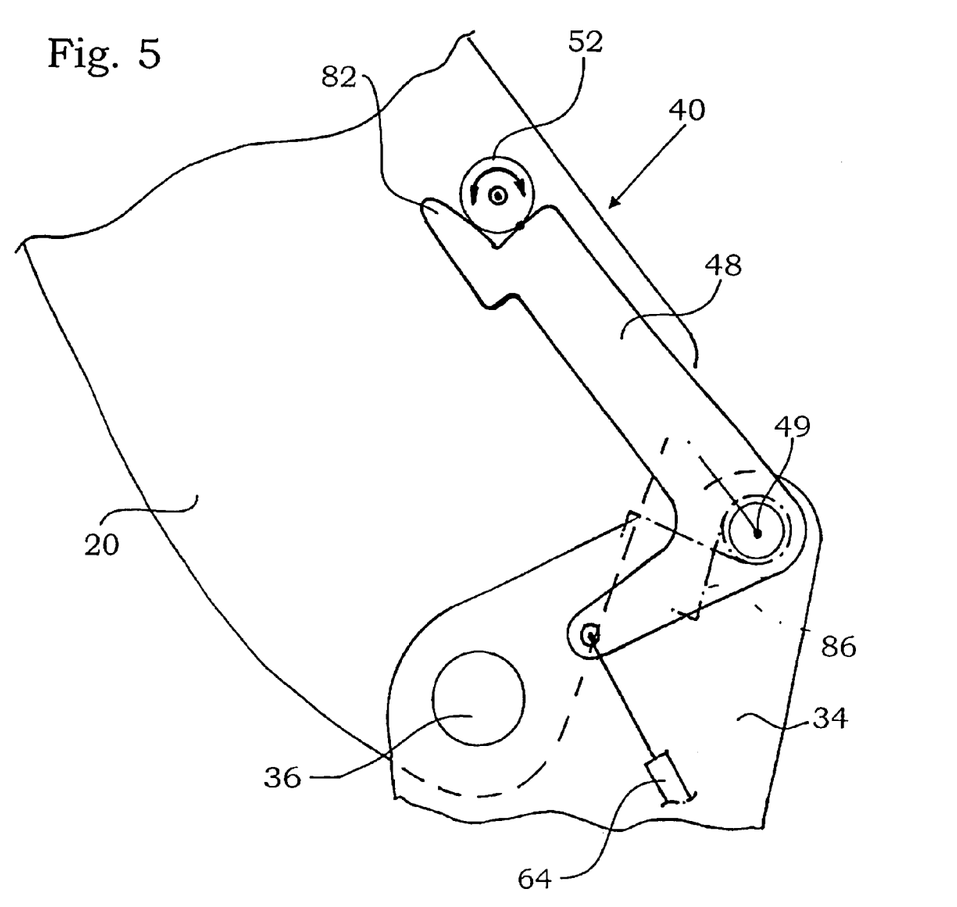
FIG. 5 shows a view similar to FIG. 3, but for another embodiment.

The embodiment as shown in FIG. 5 is similar to the embodiment of FIG. 1 as a reel is also used here. It now forms the second limit stop 52 that is connected fixedly to the seat back 20. Now, the retaining lever 48 is again made from one piece but otherwise has a geometry similar to that of the second exemplary embodiment shown in the FIGS. 2-4. Again, the spring 86 biases the retaining lever 48 clockwise. The projection 82 makes certain that the second limit stop 52 always stays on the same side of the retaining lever 48. A plastic reel, a rotatable pin, a rotatable bolt, a rubber wheel or the like can be used as the second limit stop.

Figure 7:
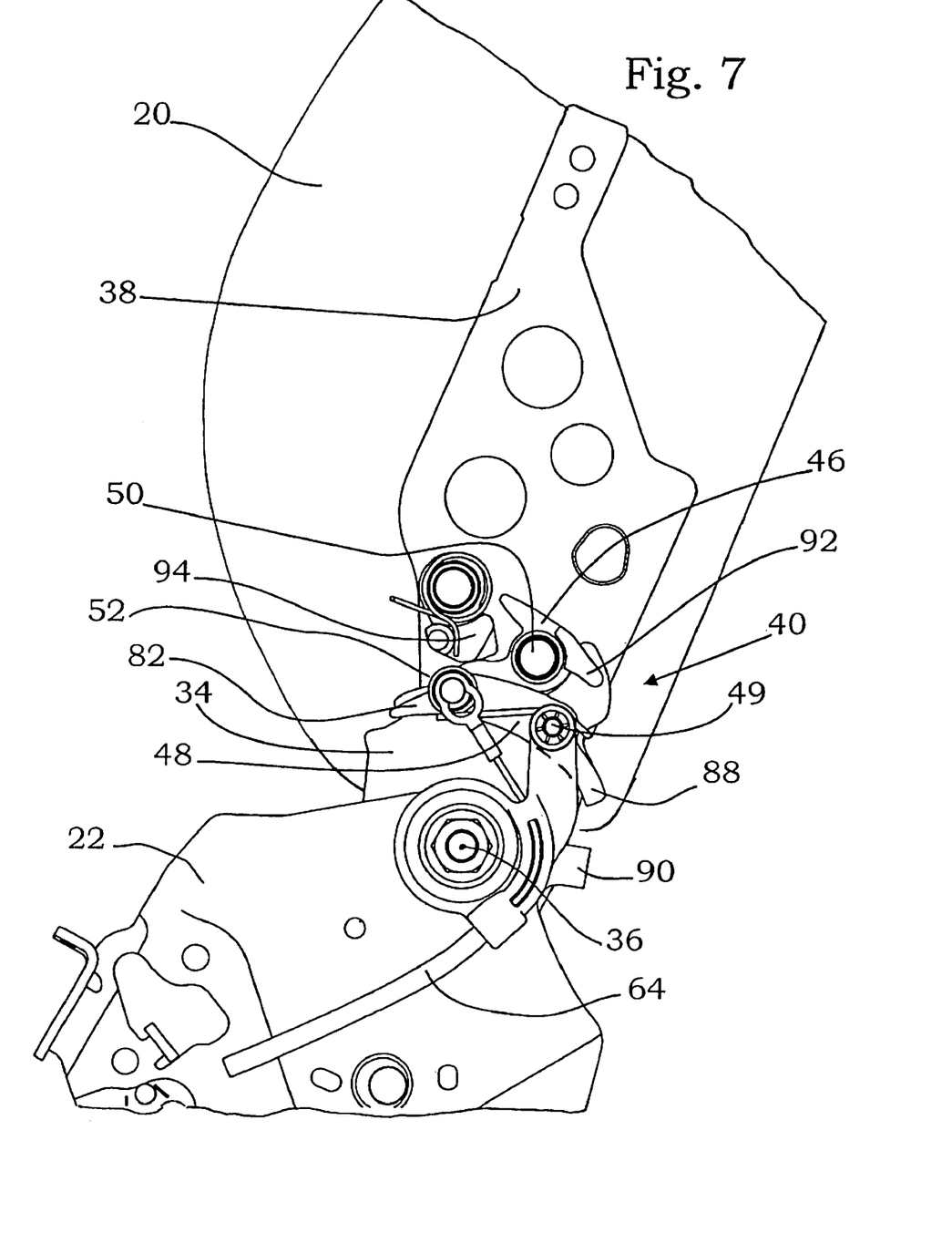
FIG. 7 shows a view according to FIG. 6 but now in the normal utilization position of the seat back.

The exemplary embodiment as illustrated in the FIGS. 7 and 8 shows a configuration in which rolling friction is made use of. The retaining lever 48 is hinged to the lower fitting 34 and is connected to the core of the second Bowden cable 64. It has a rotatable reel 50. A bolt disposed at the upper fitting 38 of the seat back 20 is provided as the second limit stop 52. In an alternative implementation, it may also be a reel. The bolt 52 simultaneously forms the pivot axis of the disengagement lever 46. A projection 82 is again formed. On the retaining lever 48 there is further formed a securing tail 88 cooperating with a securing contour 90 provided at the side part 24 or at the lower fitting 34 connected to said side part 24.

The arrangement is chosen so that the securing tail 88 and the securing contour 90 will not interact as long as the seat back 20 has not been folded from the normal utilization position far backward, e.g., into the reclined position, and is for example pivoted from the construction position backward by more than about 10 degrees. In this case, the securing tail 88 does not cooperate with the securing contour 90. If however the seat back is pivoted backward by more than a threshold value, when it is for example pivoted into its fully reclined position, the securing tail 88 is confronting the securing contour 90 and the retaining lever 48 is prevented from cooperating with the second limit stop 52, always staying beneath the second limit stop 52 so that the limit stops 50, 52 are not allowed to interact. Put another way, the securing system 88, 90 prevents the stop device 40 from engaging as the seat back 20 is folded upward from the reclined position by actuation of the disengagement member 42 and not by actuation of the normal adjusting device of the seat back 20. The stop device is made inoperative by the securing system 88, 90 as long as it is in operation.

Figure 6:
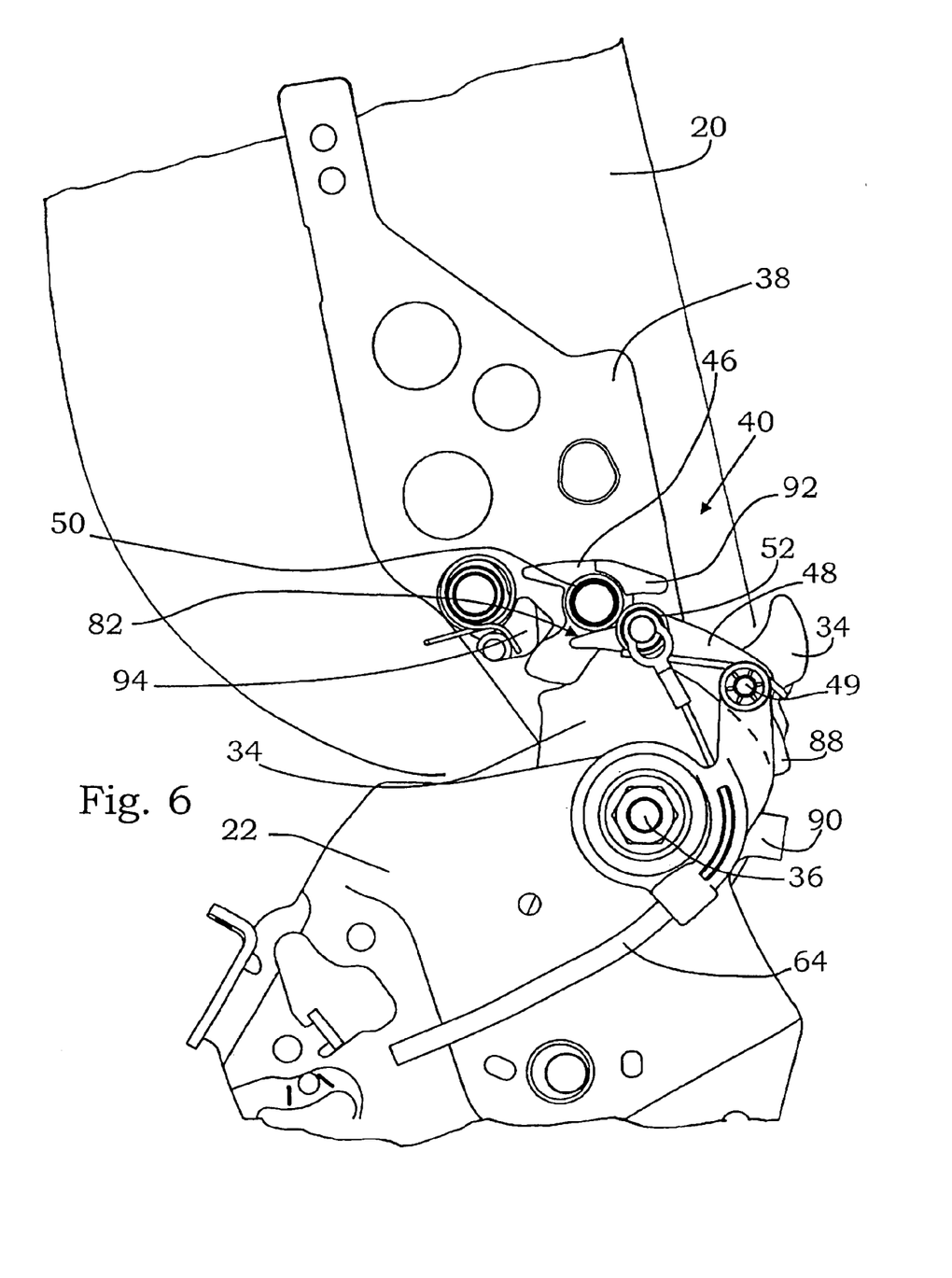
FIG. 6 shows a view similar to FIG. 1, but in the form of a detail and in another embodiment, with the seat back being shown in the forwardly folded position and being retained by the stop device

For the rest, the stop device 40 is configured similar to the exemplary embodiment as shown in FIG. 5 only that now the friction-reducing part is not distinctly disposed relative to the retaining lever 48 and associated with the seat back 20 but the reel 52 is rotatably disposed on the retaining lever 48 and cooperates with a stationary bolt 50. This permits to use the bolt 50 for another purpose. There is again provided an inclined clamping surface that is now formed by the reel 52. In the stop position as shown in FIG. 6, the bolt 50, that is the first limit stop, engages into a dell formed by the reel 52 and the projection 82.

A contour 92 or nose substantially projecting away from the disengagement lever 46 toward the back is provided on said disengagement lever. Upon actuation, the disengagement lever 46 rotates clockwise. The contour 92 then hits the reel 52, pushing it so that it is released from a stop position. The disengagement lever 46 is actuated by a control cam 94 that is also hinged to the upper fitting 38. It is pivoted counterclockwise by the traction means 44 (not shown) and causes the disengagement lever 46 to rotate clockwise through abutment against another arm of the disengagement lever 46.

In the alternative that a limit stop is implemented as a reel, said reel can be realized in a variety of ways. It may be any rotatable part. Its circumference must not extend over 360°, a smaller angular range of for example 90° will suffice. The surface of the reel may be hard or elastic; it may for example be formed from a compliant rubber O-ring. The reel may also be provided with teeth.

The invention claimed is:

1. A forwardly movable automotive vehicle seat usable as a front seat of an automotive vehicle equipped with but one side door on either side of the vehicle,
   said seat comprising a seat back and a seat frame to which belongs a seat part and being movable between a normally adopted utilization position and a forwardly moved position, the seat back being in a forwardly folded position in which it is folded forward against the seat part and the seat frame being moved forward when the seat is in the forwardly moved position,
   said seat frame comprising a locking device and the seat back being retained in the normal utilization position with respect to the seat frame so as to be adjustable about a pivot axis,
   a stop device retaining the seat back in the forwardly folded position being further associated with the seat back as long as the seat frame is located in a front portion of its path of displacement, allowing the seat back to be released so that it may be folded upward into the normal utilization position when the seat frame is located in a rear portion of the displacement path, and comprising a first limit stop and a second limit stop associated with said first limit stop, one of said limit stops being connected to the seat frame and the other limit stop being disposed on the seat back, and comprising a disengagement system that releases the stop device when the automotive vehicle seat is located in the rear portion of the displacement path, wherein at least one of the first limit stop and the second limit stop is configured to be a rotatable part or a free arm of a retaining lever, and wherein the stop device comprises a securing system that prevents the stop device from engaging while the seat back is folded upward from a position in which it is moved backward with respect to the utilization position, more specifically from a reclined position, and while a disengagement member is actuated.

2. A forwardly movable automotive vehicle seat usable as a front seat of an automotive vehicle equipped with but one side door on either side of the vehicle, said seat comprising:
a seat back;
a seat frame; and
a seat part belonging to the seat frame,
the seat being movable between a normally adopted utilization position and a forwardly moved position, the seat back being in a forwardly folded position in which it is folded forward against the seat part and the seat frame being moved forward when the seat is in the forwardly moved position,
said seat frame comprising a locking device and the seat back being retained in the normal utilization position with respect to the seat frame so as to be adjustable about a pivot axis,
a stop device retaining the seat back in the forwardly folded position being further associated with the seat back as long as the seat frame is located in a front portion of its path of displacement, allowing the seat back to be released so that it may be folded upward into the normal utilization position when the seat frame is located in a rear portion of the displacement path, and comprising a first limit stop and a second limit stop associated with said first limit stop, one of said limit stops being connected to the seat frame and the other limit stop being disposed on the seat back, and comprising a disengagement system that releases the stop device when the automotive vehicle seat is located in the rear portion of the displacement path, wherein at least one of the first limit stop and the second limit stop is configured to be a rotatable part or a free arm of a retaining lever, and wherein the rotatable part is a reel and that in the stop position said reel rests against the other limit stop.

3. The forwardly movable automotive vehicle seat as set forth in claim 2, wherein the retaining lever forms a folding lever and that in the stop position the free arm and a hinge point of the retaining lever are in an approximately extended position.

4. The forwardly movable automotive vehicle seat as set forth in claim 2, wherein the limit stop of the stop device, which is configured to be a free arm of a retaining lever, comprises an inclined clamping surface that contacts the other limit stop in the stop position.

5. The forwardly movable automotive vehicle seat as set forth in claim 2, wherein the limit stop of the stop device, which is configured to be a free arm of a retaining lever, comprises a projection that contacts the other limit stop in the stop position and that is always in front of the other limit stop when viewed in an x-direction.

6. The forwardly movable automotive vehicle seat as set forth in claim 2, wherein at least one of the first limit stop and the second limit stop is a stationary bolt.

7. The forwardly movable automotive vehicle seat as set forth in claim 2, wherein a transmission means is disposed between the seat frame and one of the limit stops, wherein a control device for actuating said transmission means when the seat is displaced from the front portion of the displacement path to the rear portion of the displacement path is provided on said seat frame and wherein the transmission means actuates one of the two limit stops so that the stop device can be brought into the release position.

8. The forwardly movable automotive vehicle seat as set forth in claim 2, wherein there is provided a contour that is movably disposed in proximity to at least one of the first limit stop and the second limit stop and that pushes said limit stop out of a stop position upon actuation of said contour.

9. The forwardly movable automotive vehicle seat as set forth in claim 2, wherein the stop device comprises a securing tail and a securing contour, one of them being disposed at the retaining lever and the other one being connected to the seat frame.

* * * * *